Aug. 10, 1926.
M. H. DAMERELL
INDICATING MACHINE
Filed Jan. 16, 1922    6 Sheets-Sheet 6
1,595,713
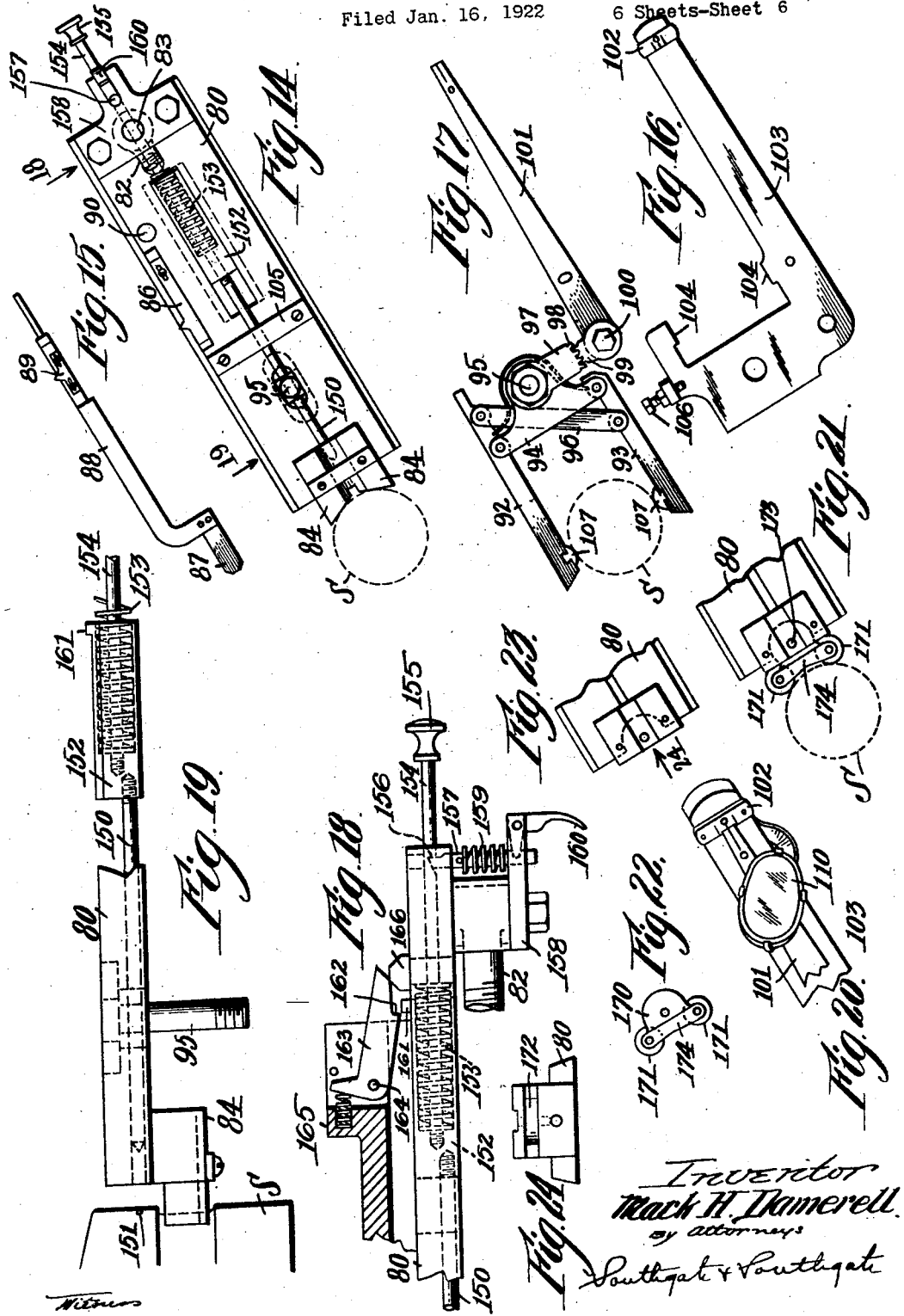

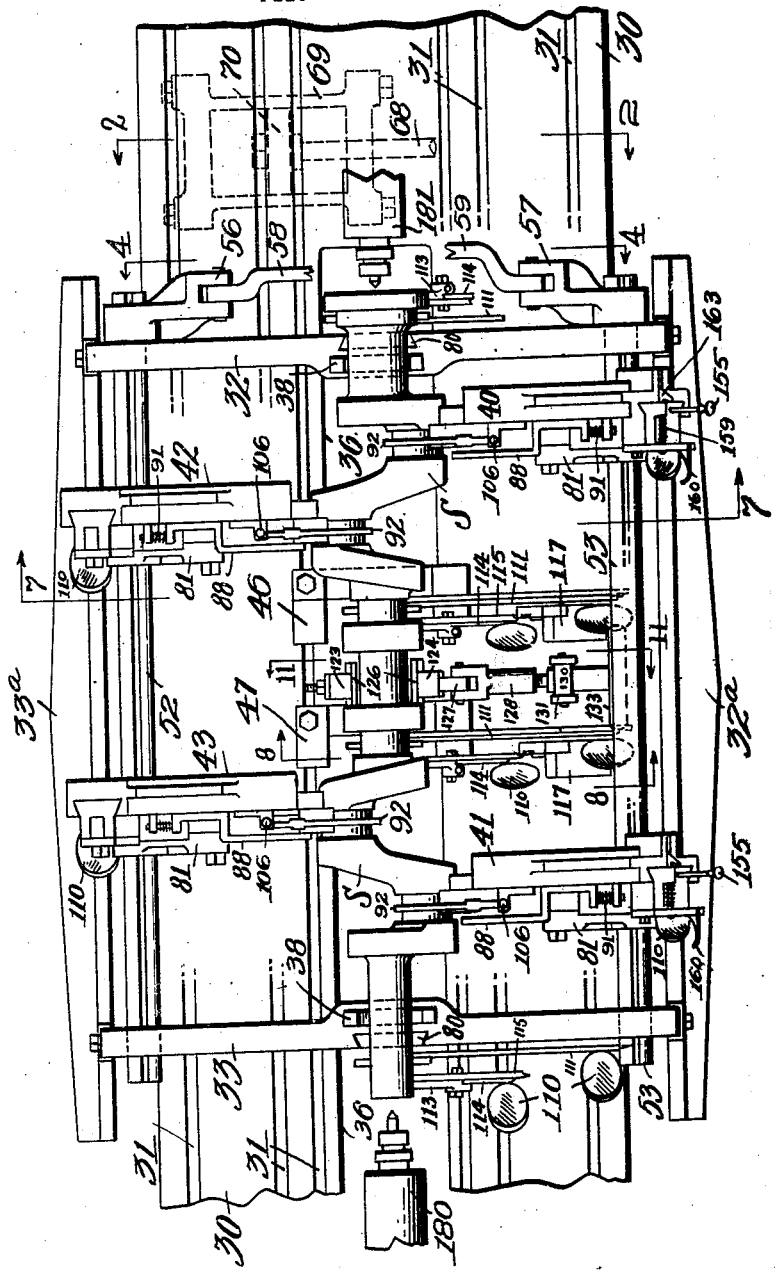

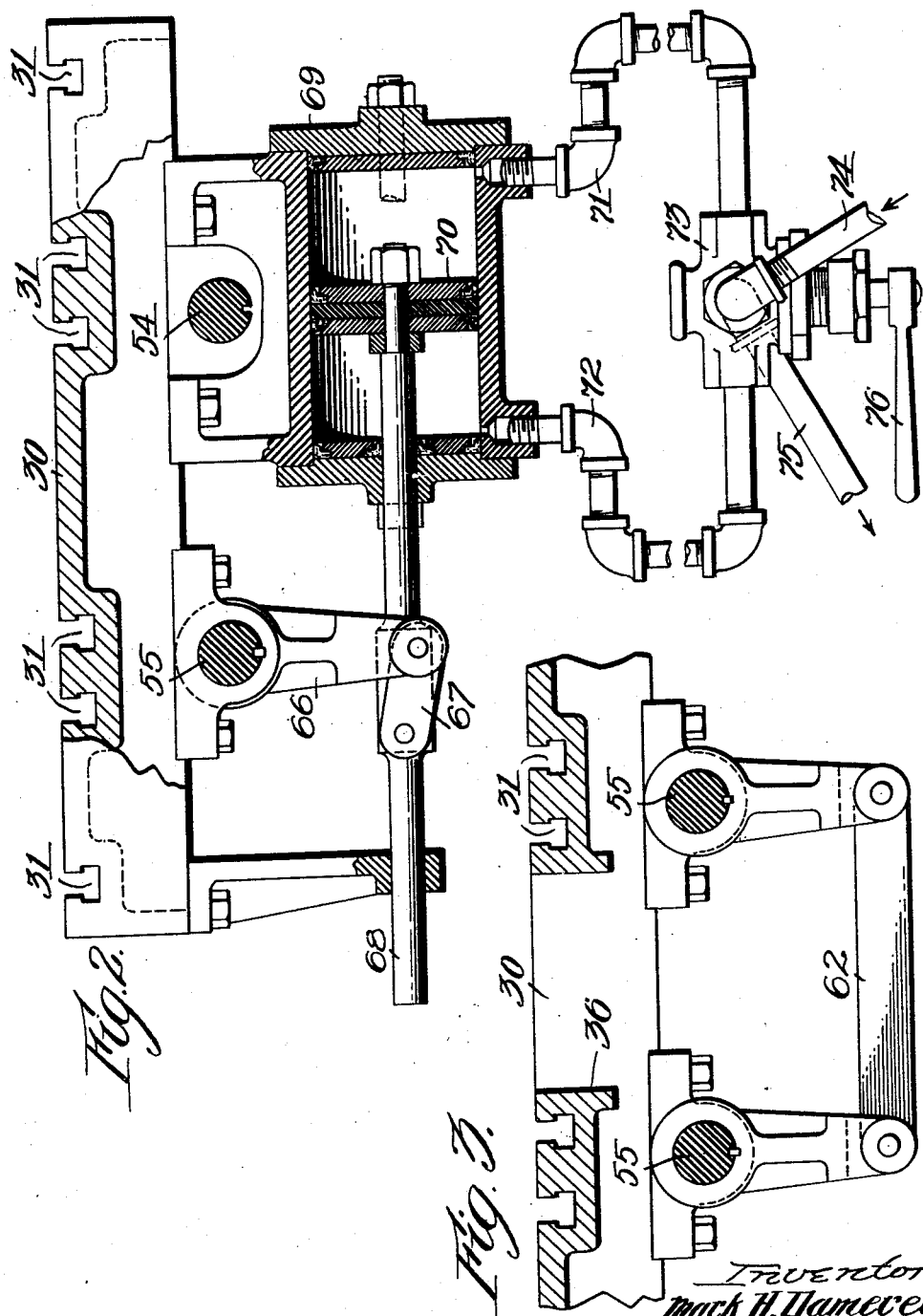

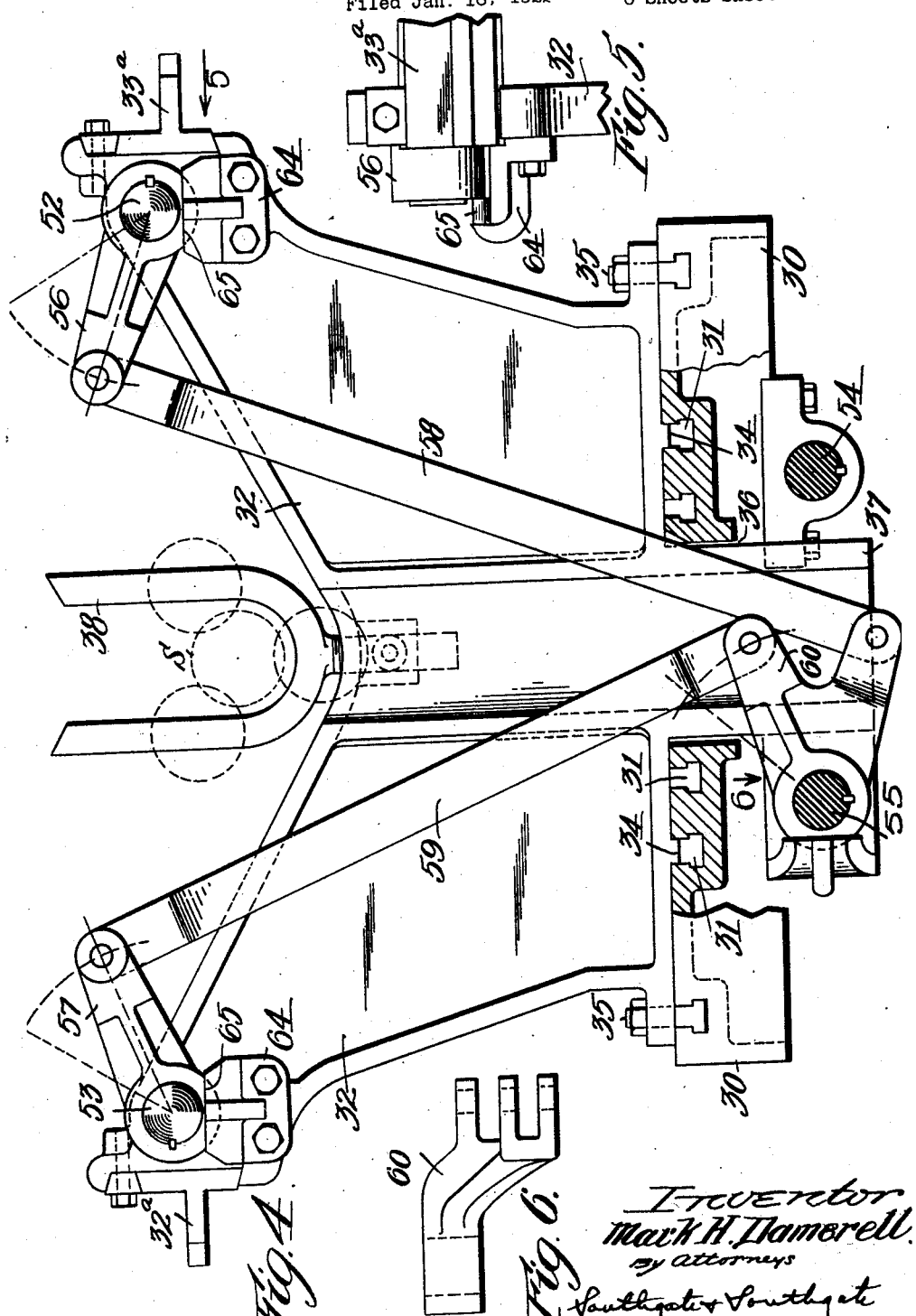

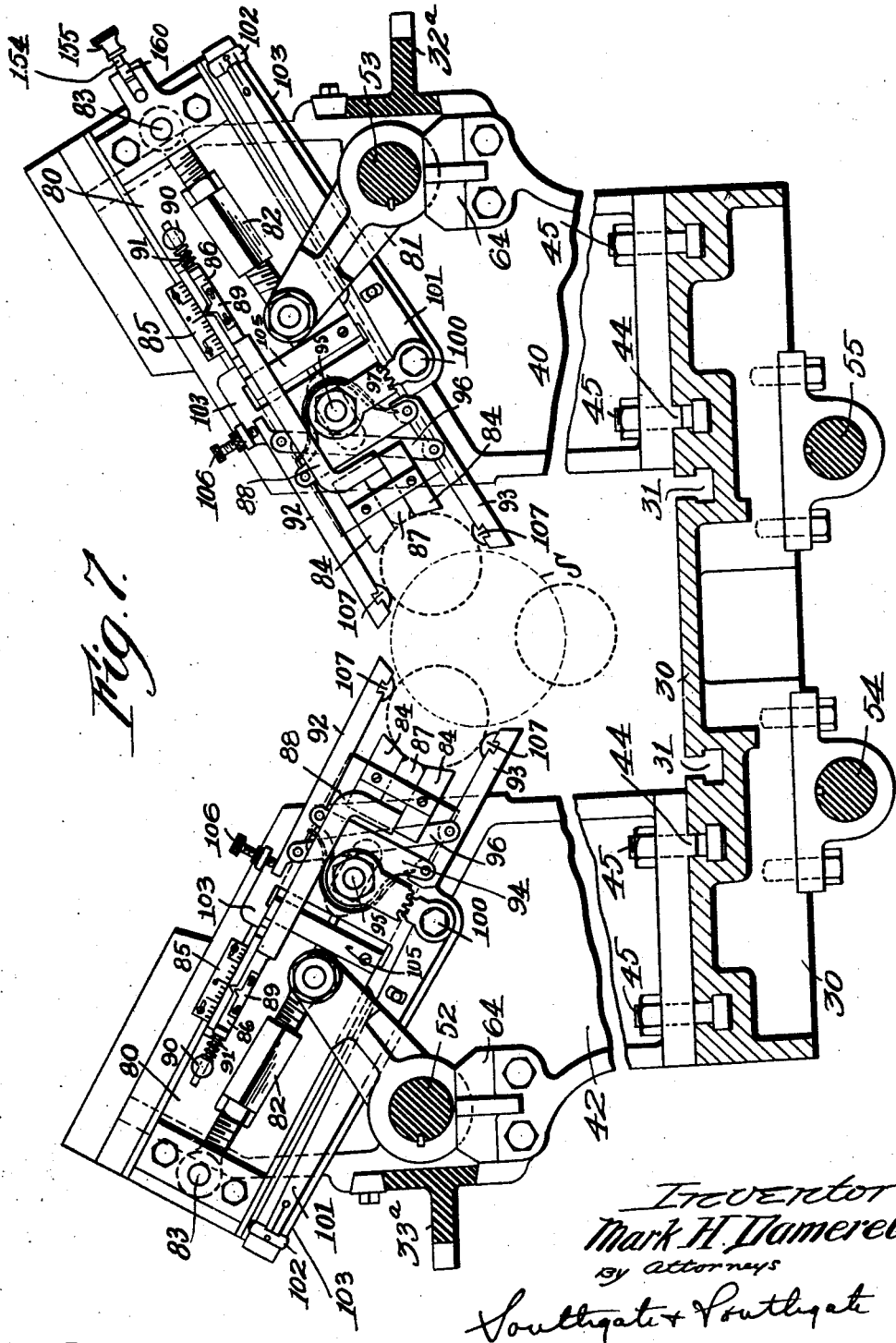

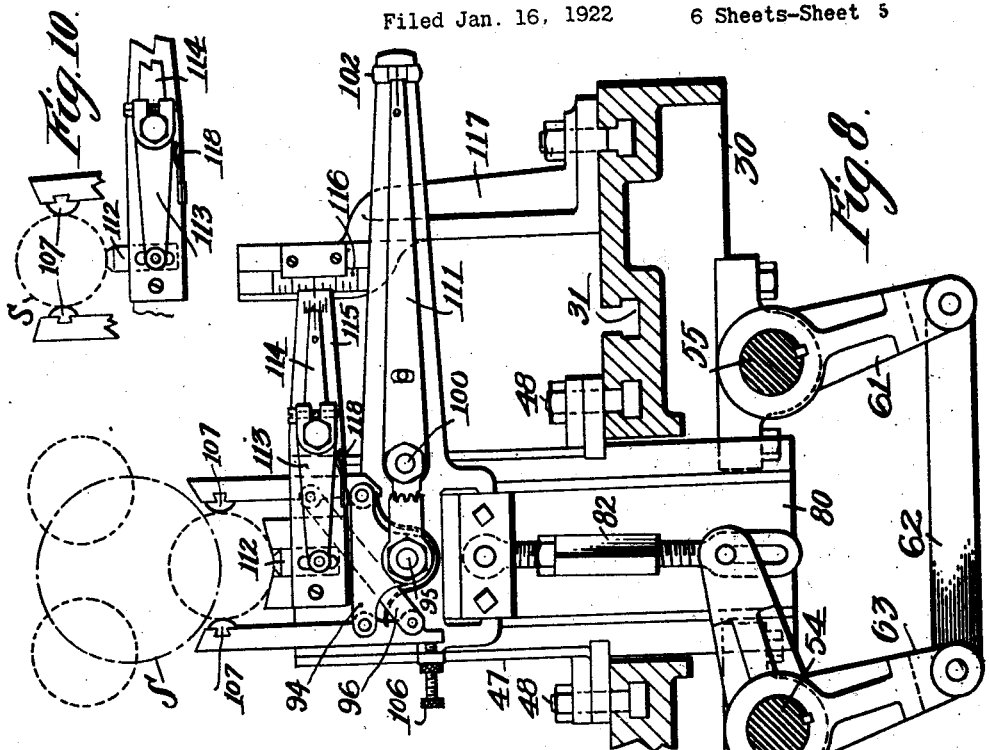

Patented Aug. 10, 1926.

1,595,713

UNITED STATES PATENT OFFICE.

MARK H. DAMERELL, OF WORCESTER, MASSACHUSETTS, ASSIGNOR TO WYMAN-GORDON COMPANY, A CORPORATION OF MASSACHUSETTS.

INDICATING MACHINE.

Application filed January 16, 1922. Serial No. 529,803.

This invention relates to a machine for testing and indicating the throw and angular relation of the different parts of an engine crank shaft. Machines have been heretofore devised for thus testing and indicating a crank shaft when supported upon previously prepared centers. It is the object of my present invention to provide a machine which will indicate and position an unsupported crank shaft, centering the mass of the shaft with respect to the several crank pins, both angularly and radially.

A further object of my invention is to provide means for forming center holes in the ends of the shaft, after it has thus been located in the machine with respect to its center of mass. My invention further relates to certain arrangements and combinations of parts, which will be hereinafter described and more particularly pointed out in the appended claims.

A preferred form of my invention is shown in the drawings, in which—

Fig. 1 is a plan view of my improved indicating machine;

Fig. 2 is a transverse sectional elevation, taken along the line 2—2 in Fig. 1;

Fig. 3 is a transverse sectional elevation showing the connection between the two actuating shafts;

Fig. 4 is a transverse sectional elevation taken along the line 4—4 in Fig. 1;

Fig. 5 is a detail side elevation looking in the direction of the arrow 5, in Fig. 4;

Fig. 6 is a detail plan view of a double arm on one of the actuating shafts, looking in the direction of the arrow 6, in Fig. 4;

Fig. 7 is a sectional elevation of certain centering and indicating devices taken along the lines 7—7 in Fig. 1;

Fig. 8 is a similar view of an end indicating device taken along the line 8—8 in Fig. 1;

Fig. 9 is an end elevation of a connection to be described;

Fig. 10 is a partial end elevation of the indicating mechanism for the end bearing of the crank shaft;

Fig. 11 is a transverse sectional elevation of the mechanism for angularly adjusting the shaft taken along the line 11—11 in Fig. 1;

Fig. 12 is a sectional plan view taken along the line 12—12 in Fig. 11;

Fig. 13 is a detail side elevation looking in the direction of the arrow 13 in Fig. 11.

Fig. 14 is a side elevation of a slide on which one of the indicating and marking devices is mounted;

Fig. 15 is a side elevation of a sliding indicator mounted thereon;

Fig. 16 is a side elevation of an index support carried by the slide;

Fig. 17 is a side elevation of a pair of indicating arms and the pointer or indicating finger connected therewith;

Figs. 18 and 19 are plan views of parts of the marking mechanism looking in the direction of the arrows 18 and 19 in Fig. 14;

Fig. 20 is a detail view showing one of the reflectors by which certain of the indications are read;

Fig. 21 is a plan view of a modified contact member and supporting slide;

Fig. 22 is a plan view of the contact member;

Fig. 23 is a plan view of the end of the slide, with the contact member removed; and Fig. 24 is an end view thereof.

Referring to the drawings, I have shown an indicating machine comprising a bed or table 30 having a plurality of longitudinal T-slots 31 formed therein, the table being supported upon a suitable base or frame not shown. Cross frames 32 and 33 (Figs. 1 and 4) are mounted to slide on the table 30, being guided thereon by ribs 34 and being secured thereto by bolts 35. The table 30 is provided with a relatively wide recess 36 (Fig. 1) throughout the middle portion of its length and the cross frames 32 and 33 have depending portions 37 (Fig. 4) extending through the recess 36. A fork or rest 38 is mounted for manual vertical adjustment in each cross frame, these forks being threaded in the frames 32 and 33 as indicated in Fig. 4. These forks receive and roughly locate the crank shaft S when it is first placed in the machine.

A pair of front frames 40 and 41 (Figs. 1 and 7) and a similar pair of rear frames 42 and 43 are mounted for longitudinal adjustment on the table 30, and are provided with guiding ribs 44 and bolts 45. Brace bars 32$^a$ and 33$^a$ are adjustably secured to the cross frames 32 and 33 and form upper supports for the front and rear frames. The bars 32$^a$ and 33$^a$ are preferably of dove-tail cross section and the several front, rear and cross frames are provided with guide-ways for said bars and with clamps by which the frames may be firmly secured to said bars at any desired points in the length thereof.

A pair of center frames 46 and 47 (Figs. 1 and 8) are similarly mounted for longitudinal adjustment on the table 30, and are secured in adjusted position by bolts 48. An adjusting frame 50 (Fig. 11) is mounted on the table 30 between the center frames 46 and 47 and is adjustably secured by bolts 51.

The devices for indicating the position of the different crank pins are mounted to slide on the cross frames, the side frames, and the center frames above described. These indicating devices are simultaneously advanced toward the crank shaft by connections from a pair of upper actuating shafts 52 and 53 (Figs. 1 and 4) and lower actuating shafts 54 and 55.

The upper shafts 52 and 53 are provided with arms 56 and 57 connected by links 58 and 59 to a double arm 60 (Figs. 4 and 6) on the lower shaft 55. The shaft 55 is also provided with an arm 61 (Fig. 8) connected by a link 62 to a bell crank 63 on the second lower shaft 54. The arms 56 and 57, the double arm 60, the arm 61, and the bell crank 63 are all keyed to their respective shafts and are freely slidable thereon as the different supporting frames are adjusted longitudinally of the table 30.

In Figs. 4 and 5, I have shown a bracket 64 secured to the stand 32 and having a portion 65 engaging the outer face of the hub of the arm 56, thus causing the arm to slide with the stand 32, when the latter is adjusted longitudinally. Similar provision is made for moving the other arms and connections above described.

An arm 66, (Fig. 2) is fixed on the shaft 55 and is connected by a link 67 to a piston rod 68, slidable in a hydraulic cylinder 69 and provided with a double acting piston 70. Water or other fluid under pressure may be admitted to either end of the cylinder 69 through pipes 71 and 72 from a four-way valve 73 having an inlet pipe 74 and a discharge pipe 75, the valve being controlled by a suitable handle 76. By setting the valve, the piston may be caused to move in either desired direction and the shafts 52, 53, 54 and 55 will receive simultaneous angular movements.

I will now describe the indicating and centering devices mounted upon the frame 40 (Fig. 7), parts thereof being shown in detail in Figs. 14 to 19. The frame 40 is provided with inclined guideways for a slide 80 (Fig. 14). An arm 81 (Fig. 7) on the shaft 53 is connected by an adjustable link 82 to a pivot stud 83 at the outer end of the slide 80. A pair of contact members 84 are fixed to the slide 80 at its lower or inner end and engage the outer face of the corresponding crank pin as the slide is advanced toward the axial center of the crank shaft.

A scale 85 has an adjustable screw and slot connection to the frame 40 and an index slide 86 is similarly secured to the slide 80 (Fig. 14). The scale and slide are adjusted for different sizes of crank shafts, preferably by the use of an accurate model or mandrel, so that the index point may correspond with the zero line of the scale when the crank is of the desired size and accurately centered.

A movable contact point 87 (Figs. 7 and 15) is mounted to slide between the contact members 84 and is provided with an extension 88 on which an index 89 is adjustably secured by a screw and slot connection. A stud 90 (Fig. 7) provides a bearing for the outer end of the extension 88 and a spring 91 normally advances the sliding contact 87 to engage the crank shaft, such engagement being at the point where the web or "flash" is formed in the forging operation.

This web or flash is removed from the forging before the indicating operation but this trimming operation is sometimes carelessly performed. The sliding contact 87 indicates by the position of its index 89 whether this operation has been carefully performed or whether too much or too little stock has been left on the crank pin.

The angular position of the crank pin is indicated by levers 92 and 93 (Fig. 17) pivotally mounted on a cross plate 94, which in turn is pivoted on a stud 95 (Fig. 19) fixed on the slide 80. A link 96 reversely connects the levers 92 and 93, so that they must swing inward or outward simultaneously but in opposite directions. An arm 97 is fixed to the plate 94 and is provided with segment gear teeth 98, meshing with similar teeth on the short arm of a bell crank 99 pivoted at 100 on the frame 40.

The long arm 101 of the bell crank 99 forms a pointer or indicator finger cooperating with a scale 102 (Fig. 16) on the outer end of an index support 103 pivoted on the stud 95 and having contact faces 104 engaging the ends of a cross plate 105 (Figs. 7 and 14), on the slide 80. An adjustable stop screw 106 (Fig. 7) on the support 103 engages the outer end of the lever 92 and limits inward movement of the contact points 107 on the ends of the levers 92 and 93.

As the slide 80 is moved inward toward the crank pin, the points 107 engage the opposite sides of the pin and are separated thereby. So long as the crank pin is accurately centered, a difference in the diameter thereof merely causes the contact points 107 to approach or recede without producing angular movement of the cross plate 94 or corresponding movement of the pointer 101. If, however, the crank pin is displaced angularly, the arms 92 and 93 and the cross plate 94 will be similarly displaced, and the amount of displacement will be shown by the pointer 101 on the scale 102. The indicating mechanism described thus furnishes accurate information as to the throw and angular position of the crank and incidentally as to the condition of the crank at the point where the web or flash has been removed, this last condition being disclosed by the relative positions of the two scales 86 and 89.

The indicating mechanism on the front frame 40, as above described, is substantially duplicated on the second front frame 41 and also on the two rear frames 42 and 43, the parts in all cases being substantially the same but some of them being made right hand or left hand to correspond to the positions in which they are used. Mirrors 110 (Figs. 1 and 20) are attached to the machine in such positions that the positions of different pointers and indexes may be easily read from the operator's position at the front of the machine.

The indexing mechanisms on the center frames 46 and 47 (Fig. 8) are also substantially similar to the mechanism on the frame 40 previously described but differ therefrom in details. The support for the index scale 102 is of different form from that shown in Fig. 16, the arm bearing the scale extending at right angles to the slide 80 and the pointer or index lever 111 forming a straight lever instead of a bell crank as shown in Fig. 17. The movement of the sliding contact or flash indicator 112 is transferred through a lever 113 to a pointer 114 which cooperates with a scale formed on the end of a plate 115, secured to the slide 80. An index mark on the end of the plate 115 also cooperates with a scale 116 adjustably secured to a bracket or scale holder 117, bolted to the base 30, this latter scale permitting an indication of the actual throw of the crank. A spring 118 yieldingly presses the contact 112 toward the crank pin.

The center indicating devices on the frames 46 and 47 thus furnish information as to the exact angular position and throw of the indicated crank pins and also as to the extent to which the web or flash has been removed.

The machine thus comprises six slides 80 mounted for simultaneous movement by the piston 70 to force their contact points 84 against the different crank pins, impelling them toward a common center. When the parts have come to rest under pressure, the different scales furnish accurate indications showing whether or not the different crank pins are acurately centered and positioned.

A certain deviation from absolute accuracy is unavoidable in forging operations and it is desirable to provide means by which the shaft after engagement by the centering and indicating devices may be turned slightly in a desired direction to more evenly distribute the inaccuracies and bring the shaft to its best average position. For this purpose I provide the adjusting mechanism appearing between the frames 46 and 47 in Fig. 1 and shown in detail in Figs. 11 to 13.

This mechanism comprises a stand 50 secured to the bed 30 by bolts 51 and longitudinally adjustable on the bed as previously described. An arm 120 is pivoted at 121 to the stand 50 and is provided with adjusting screws 122 at opposite sides of its pivot, by which its angular position may be adjusted and maintained. A pair of adjusting arms 123 and 124 is pivoted at 125 in the forked end of the arm 120 (Fig. 12). Longitudinally extended contact jaws 126 (Figs. 12 and 13) are provided at the upper end of the adjusting arms 123 and 124. The arm 124 has a forwardly projecting ear 127 to which is pivoted a forked member 128 (Fig. 1) threaded to receive a rod 129.

The rod 129 extends through a swivel bearing 130 (Fig. 11) pivoted to ears 131 secured to the frame 50. Axial movement of the rod 129 in its bearing 130 is prevented by a collar 132 engaging the bearing on one side and by the hub of a hand wheel 133 engaging the bearing on the opposite side. Rotation of the hand wheel in either direction thus causes corresponding forward or rearward movement of the adjusting arm 124.

A threaded rod 134 extends loosely through the arm 123 into an enlarged recess in the arm 124, in which it may be secured in any convenient manner, as by a cross pin 135. An adjusting nut 136 is provided on the threaded rod 134 and a spring 137 yieldingly separates the arms 123 and 124. In the use of the adjusting mechanism, the nut 136 is set so that the arms are spaced apart a distance slightly greater than the probable diameter of the crank or crank pin to be engaged. Provision is thus made for adjusting the positioned and indicated crank to average the inaccuracies disclosed.

Indicating mechanism substantially similar to the center indicating mechanism shown in Fig. 8 is also provided for engaging the end bearings of the crank shaft, such mechanism being mounted on the end cross frames 32 and 33. The principal difference between the center and the end indicating devices is in the provision of a yieldable connection in place of the adjustable link 82.

This yieldable connection is shown in Fig. 9 and comprises link ends 140 and 141 pivoted respectively to the corresponding slide 80 and to the arm 142 by which the end indicating mechanism is actuated. The link ends 140 and 141 are yieldingly forced apart by a spring 143, such movement being limited however by nuts 144 threaded on studs 145 each fixed in one of the link ends. This permits the devices associated with the crank shaft pins to position the crank shaft, while the end bearing indicating devices yieldingly indicate the position thereof without exerting positioning pressure thereon.

I have found it desirable to place a definitely located mark upon one of the crank pins of the positioned shaft, for reference in later finishing operations, and for this purpose I provide marking mechanism associated with one or more of the front indicating devices and shown in detail in Figs. 14, 18 and 19.

A plunger or rod 150 is slidably mounted in the slide 80 and is so positioned that the hardened conical point of the rod 150 will make a center mark 151 in a definite position adjacent a crank pin when forcibly advanced against the shaft. The rod 150 is threaded into a block 152 mounted in guideways in the slide 80. A second rod 154 is secured in the block 152 and extends through the outer end of the slide 80, where it is provided with a head 155. The rod 154 has a notch 156 adapted to be engaged by a bolt or latch 157 (Fig. 18) slidable in a bearing plate 158 secured to the lower side of the slide 80. A spring 159 yieldingly advances the bolt to engage the notched rod, and a trip lever or trigger 160 is provided for withdrawing the bolt. The block 152 has a shoulder or projection 161 (Figs. 18 and 19) adapted for engagement by a shoulder 162 on a latch 163 pivoted at 164 on a bracket 165 mounted on the frame 40.

The operation of the marking device is as follows:—When the slide 80 is moved inward in the frame 40 to engage and position a crank pin the shoulder 161 on the block 152 is engaged by the shoulder 162 on the latch 163 and is held from inward movement with the slide. Relative outward movement of the block 152 and notched rod 154 is thus produced, the parts moving toward the position shown in Fig. 18. As the notch 156 is moved outward beyond the bolt 157, a projection 166 on the slide 80 engages the cam-like end of the latch 163 and releases the block 152, but the parts are retained in the position of Fig. 18 by the bolt 157, the spring 153 being in compression.

When it is desired to mark the crank shaft, the trigger 160 is moved to withdraw the bolt 157 and release the block 152. The block is then moved forcibly inward, carrying with it the marking rod 150 to indicate the desired point on the crank shaft.

In Figs. 21 to 24 I have shown a modified contact device for engaging the crank pin as the slides are moved inward. This device comprises a plate 170 provided with a pair of contact rolls 171 adapted to engage the crank pin at two separated points. The middle portion of the plate 170 is received in a recess 172 in the end of the slide 80 and is pivoted thereon by a stud or pin 173. The outer portion 174 of the plate 170 is spaced sufficiently from the end of the slide 80 to permit limited angular movement of the plate and contact rolls. This construction permits the apparatus to adapt itself to slight irregularities in the surface of the crank pin to be indicated.

The general method of using my improved machine has been set forth in the detailed description thereof. The crank shaft to be indicated is placed in the forked end supports or rests 38 which hold the shaft in approximate position for engagement by the positioning and indicating devices. The six indicating slides are then advanced toward the bracket, together with the two end bearing indicators.

The position assumed by the crank shaft is determined by the simultaneous action of the six slides which engage crank pins, and the accuracy or inaccuracy of the different portions of the shaft is immediately disclosed by the several indicating devices. The adjusting mechanism shown in Fig. 11 may then be used to turn the shaft in one direction or the other to give the best average distribution of the inaccuracies disclosed. When the shaft is thus positioned, drilling mechanism indicated at 180 and 181 in Fig. 1 may be advanced toward the work to form center holes therein. This center hole forming mechanism is of a usual commercial form and in itself constitutes no part of my present invention.

This method of indicating a crank shaft is found to result in centering the shaft as accurately as possible with reference to its center of mass about which center the distribution of metal in the shaft is arranged. Shafts thus centered are accordingly found to give more satisfactory results at high speed than when centered by any other method or machine with which I am at present familiar.

Having thus described my invention, it will be evident that changes and modifications can be made therein by those skilled in the art within the spirit and scope of my invention as set forth in the claims, and I do not wish to be otherwise limited to the details herein disclosed, but what I claim is:—

1. A crank shaft testing and indicating machine having, in combination, a plurality of crank engaging members movable along radial lines toward a common center to simultaneously engage different cranks of the crank shaft, and a single fluid operated means effective to advance said members simultaneously and at equal rates of movement toward said cranks.

2. A crank shaft testing and indicating machine, having, in combination, a plurality of crank engaging members movable along different radial lines toward a common center line to simultaneously engage different cranks of said shaft, and means to advance said members simultaneously toward said center line, the contact surfaces of the different members being at all times equally distant from the center line.

3. A crank shaft testing and indicating machine comprising an elongated bed, a plurality of slides relatively adjustable longitudinally of the machine bed and also movable transversely thereto at angles corresponding to different crank positions toward a common center line, shaft engaging devices mounted on said slides, and means to move said slides simultaneously and equally toward and from the common center.

4. A crank shaft testing and indicating machine comprising means to approximately position a crank shaft in said machine, a plurality of crank engaging devices, and means to move said devices simultaneously and equally toward a common center to each engage a different crank of said shaft and to accurately position said shaft.

5. A crank shaft testing and indicating machine comprising a plurality of crank engaging devices, means to simultaneously and equally advance said devices to engage and position a shaft, indicating means and connections between said means and said devices, whereby said indicating means are actuated by said devices to indicate the throw and angular position of each crank.

6. A crank shaft testing and indicating machine comprising a plurality of crank engaging devices, a single actuator therefor, and operative connections from said actuator to said devices effective to move said devices equally and simultaneously to each engage a different crank of the shaft.

7. A crank shaft testing and indicating machine comprising a plurality of crank engaging devices, a single actuator therefor, means to yieldingly advance said actuator and positive connections from said actuator to said devices, said devices being movable thereby equally and simultaneously toward a common center line.

8. In a crank shaft testing and indicating machine, a slide, a contact member mounted on said slide, an auxiliary contact element movably mounted on said slide adjacent said member, means to indicate the position of said contact element relative to said member, and connections between said indicating means and said contact element.

9. A crank shaft testing and indicating machine comprising means to engage the different cranks of a crank shaft and to position and support said shaft by its cranks in said machine, means to indicate the positions of the different cranks of said shaft when thus positioned and supported, means to indicate the position of the end bearings thereof and actuating connections effective to operate said engaging means and said indicating means.

10. A crank shaft testing and indicating machine comprising means to engage the different cranks of a crank shaft and to position and support said shaft by its cranks in said machine, means to indicate the positions of the different cranks of said shaft when thus positioned and supported, means to indicate the position of the end bearings thereof and actuating connections effective to operate said engaging means and said indicating means, said crank engaging means being movable in fixed relation and said indicating means for said end bearings being yieldably movable relative to said crank-engaging means.

11. A crank shaft testing and indicating machine comprising means to engage the different cranks of a crank shaft and to position and support said shaft by its cranks in said machine, means to indicate the positions of the different cranks of said shaft when thus positioned and supported, actuating connections effective to operate said engaging means and said indicating means, and means to angularly adjust a positioned shaft.

12. A crank shaft testing and indicating machine comprising means to engage the different cranks of a crank shaft and to position and support said shaft by its cranks in said machine, means to indicate the positions of the different cranks of said shaft when thus positioned and supported, actuating connections effective to operate said engaging means and said indicating means, and means to angularly adjust a positioned shaft, said means comprising a pair of oppositely disposed arms embracing a portion of said shaft, and means to exert pressure through either arm against said shaft.

13. A crank shaft testing and indicating machine comprising means to engage the different cranks of a crank shaft and to position and support said shaft by its cranks in said machine, means to indicate the positions of the different cranks of said shaft when thus positioned and supported, actuating connections effective to operate said engaging means and said indicating means, and means to form center holes in a shaft thus positioned.

14. A crank shaft testing and indicating machine comprising means to engage the different cranks of a crank shaft and to position and support said shaft by its cranks in said machine, means to indicate the positions of the different cranks of said shaft when thus positioned and supported, actuating connections effective to operate said engaging means and said indicating means, and means to mark a shaft when thus positioned.

15. A crank shaft testing and indicating machine comprising means to engage the different cranks of a crank shaft and to position and support said shaft by its cranks in said machine, means to indicate the positions of the different cranks of said shaft when thus positioned and supported, actuating means and connections therefrom effective to operate said engaging means and said indicating means, and means to mark a shaft when thus positioned, said latter means comprising a marking plunger, a spring to advance said plunger against the shaft, a latch to hold said plunger withdrawn, and means to release the latch.

16. A crank shaft testing and indicating machine comprising means to engage the different cranks of a crank shaft and to position and support said shaft by its cranks in said machine, means to indicate the positions of the different cranks of said shaft when thus positioned and supported, actuating means and connections therefrom effective to operate said engaging means and said indicating means, and means to mark a shaft when thus positioned, said means comprising a marking plunger, an actuating spring, a device operative to relatively withdraw and latch said plunger as the centering means is advanced toward the shaft, and means to thereafter release said marking plunger.

17. A crank shaft testing and indicating machine comprising means to engage the different cranks of a crank shaft and to position and support said shaft by its cranks in said machine, means to indicate the positions of the different cranks of said shaft when thus positioned and supported, actuating means and connections therefrom effective to operate said engaging means and said indicating means, a shaft-marking device, means to set said device for operation as the positioning means is advanced toward the shaft, and means to thereafter release said marking device.

18. A crank shaft testing and indicating machine comprising a plurality of crank positioning and indicating devices, a pressure cylinder, a piston therein, and positive operative connections from said piston effective to advance said positioning and indicating devices to operatively engage the work.

19. A crank shaft testing and indicating machine comprising a plurality of crank positioning and indicating devices, end bearing indicating devices, a yieldingly actuated piston, yieldable connections from said piston to each end indicating device, and positive operative connections from said piston effective to advance said positioning and indicating devices to operatively engage the work.

20. In a crank shaft testing and indicating machine, means to indicate the throw of a crank, means to indicate the position of a point on the curved outer surface of said crank relative to the position of a corresponding point on a true cylinder of the same size as said crank and coinciding in position therewith, and connections effective to operate both indicating means.

21. In a crank shaft testing and indicating machine, means to indicate the throw of a crank at two separated points, means to indicate the position of a point on the outer surface of the crank between said separated points and relative thereto, and connections effective to operate both indicating means.

22. In a crank shaft testing and indicating machine, a crank positioning slide, means to support said slide for movement relative to said shaft, means to move said slide toward and from a crank of said shaft, a plate pivoted to said slide, and a pair of contact rolls mounted on said plate and movable therewith to engage a crank at separated points thereon.

23. A crank shaft testing and indicating machine having, in combination, a plurality of crank engaging members movable along different radial lines toward a common center line to simultaneously engage different cranks of said shaft, and means to advance said members simultaneously toward said center line.

24. A crank shaft testing and indicating machine comprising means to engage the different cranks of a crank shaft and to position and support said shaft by its cranks in said machine, means to indicate the positions of the different cranks of said shaft when thus positioned and supported, and means to mark a shaft when thus positioned, said latter means comprising a marking plunger and a spring to advance said plunger against the shaft.

25. In a crank shaft testing and indicating machine, a longitudinally extended bed, a crank positioning slide, means to support said slide for movement longitudinally relative to said bed, means to move said slide transversely of said bed toward and from a crank of said shaft, and a plate pivoted to said slide, said plate having contact elements mounted thereon and movable therewith and effective to engage a crank at separated points thereon.

In testimony whereof I have hereunto affixed my signature.

MARK H. DAMERELL.